United States Patent
Nakamura

(10) Patent No.: US 9,418,324 B2
(45) Date of Patent: Aug. 16, 2016

(54) CONTROL DEVICE FOR CONTROLLING PRINTING BASED ON A FIRST AND SECOND PERIOD

(71) Applicant: Kuniki Nakamura, Gifu (JP)

(72) Inventor: Kuniki Nakamura, Gifu (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 21 days.

(21) Appl. No.: 13/847,735

(22) Filed: Mar. 20, 2013

(65) Prior Publication Data

US 2013/0308153 A1   Nov. 21, 2013

(30) Foreign Application Priority Data

May 15, 2012   (JP) .................................. 2012-111977

(51) Int. Cl.
   *G06K 15/00*   (2006.01)
   *G06F 3/12*   (2006.01)

(52) U.S. Cl.
   CPC ............ *G06K 15/408* (2013.01); *G06F 3/1204* (2013.01); *G06F 3/1208* (2013.01); *G06F 3/1256* (2013.01); *G06F 3/1285* (2013.01); *G06F 3/1267* (2013.01); *G06K 15/002* (2013.01)

(58) Field of Classification Search
   None
   See application file for complete search history.

(56) References Cited

U.S. PATENT DOCUMENTS

| | | | | |
|---|---|---|---|---|
| 5,963,216 A | * | 10/1999 | Chiarabini | G06F 3/1208 345/660 |
| 2003/0011792 A1 | * | 1/2003 | Noyes | B41J 2/2135 358/1.4 |
| 2005/0206945 A1 | * | 9/2005 | Kumazawa | G06F 3/121 358/1.14 |
| 2008/0007767 A1 | * | 1/2008 | Ishimaru | G06F 21/35 358/1.15 |
| 2009/0244621 A1 | * | 10/2009 | Young et al. | 358/1.16 |

FOREIGN PATENT DOCUMENTS

| | | | |
|---|---|---|---|
| JP | 2008242599 A | * | 10/2008 |
| JP | A-2008-242599 | | 10/2008 |
| JP | A-2011-112938 | | 9/2011 |

* cited by examiner

*Primary Examiner* — Vincent Rudolph
*Assistant Examiner* — Richa Mishra
(74) *Attorney, Agent, or Firm* — Scully, Scott, Murphy & Presser, P.C.

(57) ABSTRACT

A control device functions as a print data acquisition unit which acquires print data including first page data, second page data, and third page data, and a print control unit which executes a print control using the print data to control a print execution section. The print control unit cancels the printing in response to a user instruction while the printing is performed. The print control includes a period control of controlling a first period from a start of printing using the first page data to a start of printing using the second page data and a second period from the start of printing using the second page data to a start of printing using the third page data, wherein the first period is determined by using a first delay period and longer than the second period.

17 Claims, 9 Drawing Sheets

FIG. 6

| THE NUMBER OF HOPS HN | INITIAL VALUE T0 (SECONDS) OF WAITING PERIOD | THE NUMBER OF WAITING PAGES WN | |
|---|---|---|---|
| 0 | 10 | 5 | A1 |
| 1 | 20 | 5 | |
| 2 | 30 | 5 | |
| 3 | 40 | 10 | |
| 4 | 50 | 10 | |
| 5 | 60 | 10 | |
| DEFAULT VALUE | 40 | 10 | A2 |

292

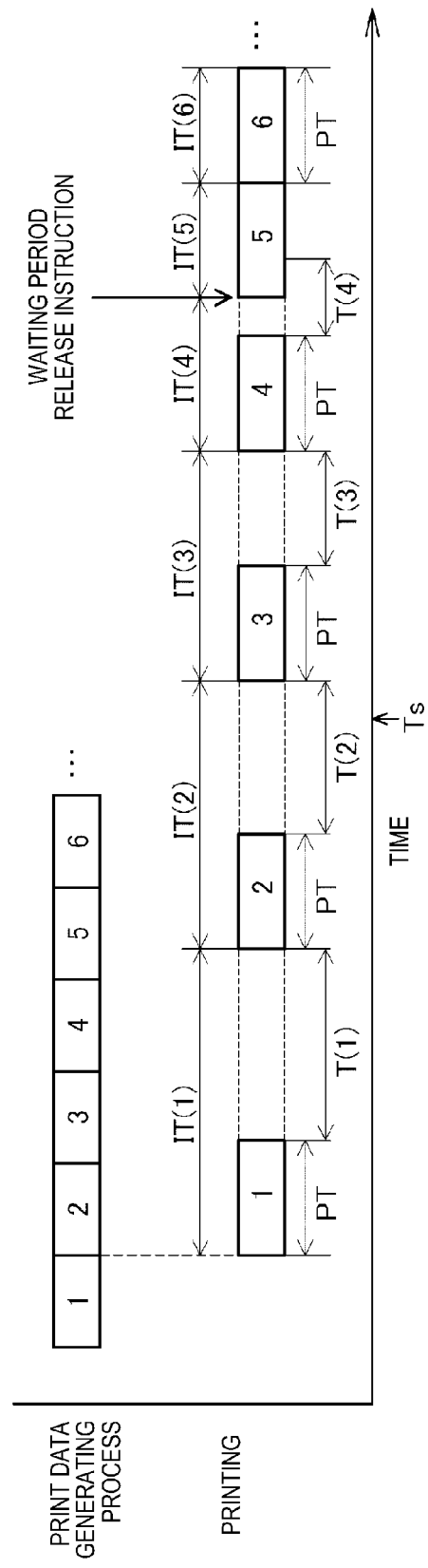
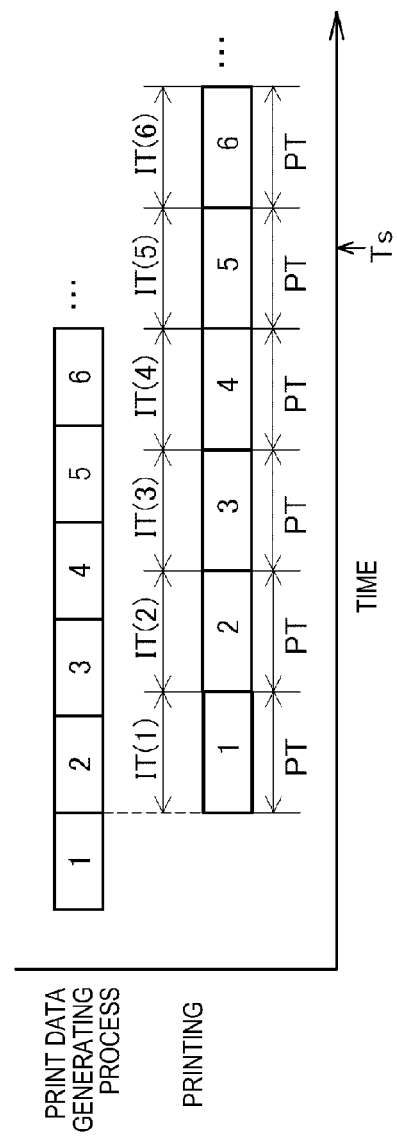
FIG. 9A CONFIRMATION MODE
FIG. 9B NORMAL MODE

CONTROL DEVICE FOR CONTROLLING PRINTING BASED ON A FIRST AND SECOND PERIOD

CROSS-REFERENCE TO RELATED APPLICATION

This application claims priority from Japanese Patent Application No. 2012-111977, filed on May 15, 2012, the entire subject matter of which is incorporated herein by reference.

TECHNICAL FIELD

Aspects of the present invention relate to a control of a print execution, and more particularly, to a technique for controlling printing of a plurality of pages.

BACKGROUND

JP-A-2011-112938 describes a technique, in printing a plurality of copy units, which sets a waiting period from print completion of a predetermined number of copy units to a print start of a subsequent copy unit. Since this technique sets the waiting period according to a time required for a post-processing (sorting or clipping) of a user for a printed sheets, convenience of printing can be improved.

However, this technique does not consider a possibility that a user interrupts the printing, for example, when the printing is performed differently from an intention of the user. Therefore, when the user interrupts the printing, this technique may be inconvenient.

SUMMARY

Accordingly, an aspect of the present invention provides a technique for improving convenience of printing while considering a possibility that a user interrupts the printing.

According to an illustrative embodiment of the present invention, there is provided a control device for controlling a print execution section, the control device including a processor, and a memory which stores a computer program that, when executed by the processor, causes the control device to function as a print data acquisition unit and a print control unit. The print data acquisition unit is configured to acquire print data including first page data, second page data to be processed subsequent to the first page data, and third page data to be processed subsequent to the second page data. The print control unit is configured to execute a print control using the print data to control the print execution section to execute printing of a plurality of pages. The print control unit is configured to cancel the printing in response to a user instruction while the printing is performed. The print control includes a period control of controlling a first period and a second period, the first period being from a start of printing using the first page data to a start of printing using the second page data and being determined by using a first delay period, and a second period being from the start of printing using the second page data to a start of printing using the third page data, and the first period being longer than the second period.

According to the above configuration, since the print control unit controls the period from the start of printing using the first page data to the start of printing using the second page data to become the first period using the first delay period, so that the period becomes longer than a second period from the start of printing using the second page data to the start of printing using the third page data. As a result, in the case where the printed result of the page and the printed result of the page prior to the printing using the first page data are different from an intention of the user, it is possible to decrease the possibility that the printing using the second page data and the printing of a page subsequent to the printing using the second page data are performed. Therefore, the unnecessary printing can be decreased and the convenience of the printing can be increased.

The present invention can be realized in various forms; for example, in the form of a method for realizing the function of the device, in the form of a computer program for realizing the function of the device, and in the form of a recording medium storing the computer program.

BRIEF DESCRIPTION OF THE DRAWINGS

The above and other aspects of the present invention will become more apparent and more readily appreciated from the following description of illustrative embodiments of the present invention taken in conjunction with the attached drawings, in which:

FIG. 6 is a diagram illustrating an example of a delay period data 232;

FIGS. 9A and 9B are timing charts of printing in a confirmation mode and a normal mode according to the first illustrative embodiment;

DETAILED DESCRIPTION

A. First Illustrative Embodiment

A-1. Configuration of Print System

Figure 1:
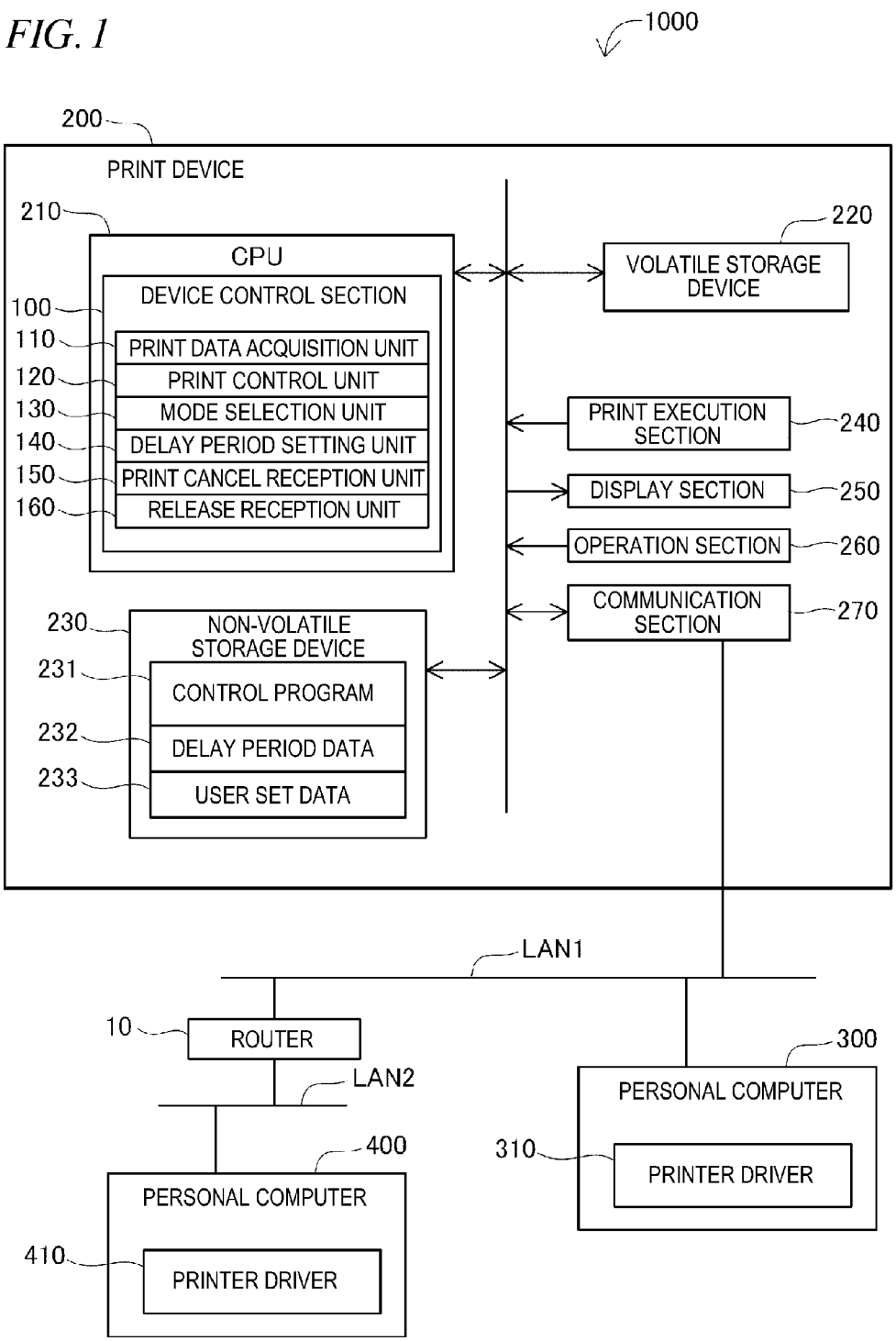
FIG. 1 is a block diagram illustrating the configuration of a print system according to a first illustrative embodiment.

An illustrative embodiment of the present invention will be described with reference to the accompanying drawings. FIG. 1 is a block diagram illustrating the configuration of a print system according to a first illustrative embodiment. A print system 1000 includes a print device 200 and computers 300 and 400. The print device 200 is communicably connected to the computer 300 via a local area network LAN1. Also, the print device 200 is communicably connected to the computer 400 via the local area network LAN1, a router 10, and a local area network LAN2.

The print device 200 includes a CPU 210, a volatile storage device 220 such as a RAM, a non-volatile memory device 230 such as an EEPROM, a print execution section 240, a display section 250 such as a liquid crystal panel, an operation section 260 having a touch panel overlapped with various buttons or liquid crystal panel, and a communication section 270 having an interface to be connected to the network.

The print execution section 240 is a device which functions as a laser printer to form an image using toner of plural colors (e.g., four colors of CMYK) as a print material (consumable material). That is, the print execution section 240 performs an exposure process for exposing a photosensitive body using a laser, a development process of attaching the toner on an electrostatic latent image formed on the photosensitive body by the exposure, a transfer process of transferring the developed toner image from the photosensitive body on a print medium, and a fixing process of fixing the transferred toner image on the print medium.

The volatile storage device 220 provides a buffer region for temporarily storing several intermediate data generated when the CPU 210 performs various processes. The non-volatile memory device 230 stores a control program 231, a delay period data 232 (will be described later), and a user set data 233 for storing contents of user settings.

The CPU 210 functions as a device control section 100 for controlling the whole print device 200 by executing the control program 231. The device control section 100 includes a print data acquisition unit 110, a print control unit 120, a mode selection unit 130, a delay period setting unit 140, a print cancel reception unit 150, and a release reception unit 160. The process performed by the respective function units will be described later.

The computers 300 and 400 are personal computers having a CPU or a memory (not illustrated). The CPU of the computers 300 and 400 executes a driver program (not illustrated) to functions as printer drivers 310 and 410. The printer drivers 310 and 410 generate print jobs in accordance with an instruction of the user, and transmit the print jobs to the print device 200 via networks LAN 1 and/or LAN2.

A-2. User Selection of Print Mode

Figure 2A:
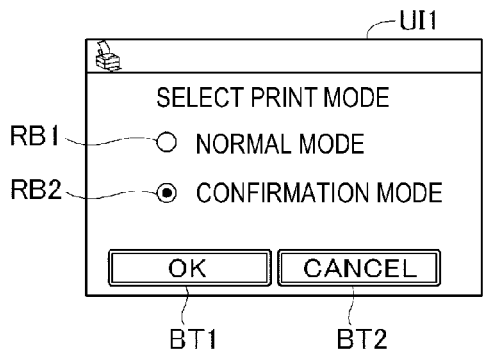
FIGS. 2A and 2B are diagrams explaining a selection of a print mode.
Figure 2B:
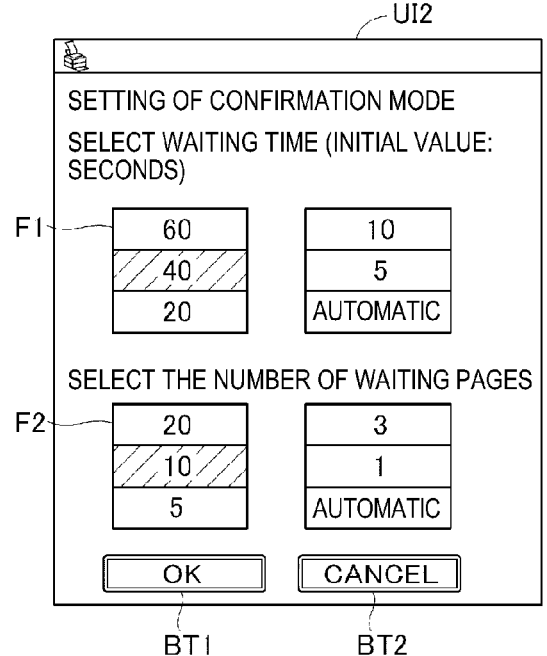

FIGS. 2A and 2B are diagrams explaining the selection of the print mode. In this illustrative embodiment, the following description is based on the assumption that the user instructs either of the computers 300 and 400 to transmit the print job to the print device 200. The print device 200 can execute the printing in either one print mode of the confirmation mode and the normal mode. The confirmation mode is a print mode of executing a print control including a period control to reduce a possibility that unnecessary or unintended printing is performed (will be described later). The normal mode is a known print mode, that is, a print mode of executing the print control without the period control.

The device control section 100 can display a first user setting screen UI1 (FIG. 2A) for receiving a mode selection instruction from the user on the display section 250. The first user setting screen UI1 has radio buttons RB1 and RB2 for selecting either one of the normal mode and the confirmation mode, a selection decision button BT1, and a selection cancel button BT2. The user selects a desired print mode by selecting either one of the radio buttons RB1 and RB2 and then press the selection decision button BT1. The device control section 100 sets the print mode by recording information specifying the print mode (normal mode or confirmation mode) in accordance with the mode selection instruction of the user, in the user set data 233 (FIG. 1). In this instance, in the case where the selection of the print mode is not performed through the first user setting screen UI1, the print mode is set as a preset mode (default print mode) between the normal mode and the confirmation mode.

The device control section 100 displays a second user setting screen UI2 (FIG. 2B) for receiving a selection instruction of setting values relating to a waiting period (waiting period-related values) on the display section 250 when the print mode is set as the confirmation mode based on the mode selection instruction received through the first user setting screen UI1. The waiting period-related values include an initial value T0 of the waiting period and the number of waiting pages WN. The waiting period is a period in which execution of the printing is temporarily stopped intentionally after printing of each of pages (referred to as waiting period set pages) is finished, in the printing of the confirmation mode of this illustrative embodiment (will be described later). The number of waiting pages WN is the number of waiting period set pages. The second user setting screen UI2 has a plurality of first selection fields F1 for receiving the initial value of the waiting period, a plurality of second selection fields F2 for receiving the number of waiting pages WN, a selection decision button BT1, and a selection cancel button BT2.

The plurality of first selection fields F1 respectively correspond to a plurality of options (60, 40, 20, 10, 5 seconds in the example in FIG. 2B) of the initial value T0 and an automatic setting. The plurality of second selection fields F2 respectively correspond to plurality of options (20, 10, 5, 3, 1 page in the example in FIG. 2B) of the number of waiting pages WN, and an automatic setting. The user selects the desired waiting period-related values by selecting the selection field one by one among the plurality of first selection fields F1 and the plurality of second selection fields F2, and then pressing the selection decision button BT1. The device control section 100 sets the waiting period-related values by recording the waiting period-related values according to the selection instruction of the user in the user set data 233 (FIG. 1). In this instance, in the case where the selection instruction of the user is the automatic setting, the initial value T0 and/or the number of waiting pages WN is set as default values (preset value). These default values are previously recorded in the delay period data 232 (FIG. 1) (will be described later).

Further, the user can select the print mode and the waiting period-related values through the printer drivers 310 and 410 of the computers 300 and 400. Specifically, the printer drivers 310 and 410 receive the selection instruction of the print mode and the selection instruction of the waiting period-related value from the user by displaying the same screen as the above-described first and second user setting screens UI1 and UI2 (FIG. 2) on the display devices of the computers 300 and 400. The printer drivers 310 and 410 notify the print device 200 of the contents of the selection instruction for every print job by including the information (hereinafter, referred to as user designation information) indicating the contents (selected print mode and waiting period-related values) of the selection instruction in the print job.

A-3. Printing Process

Figure 3:
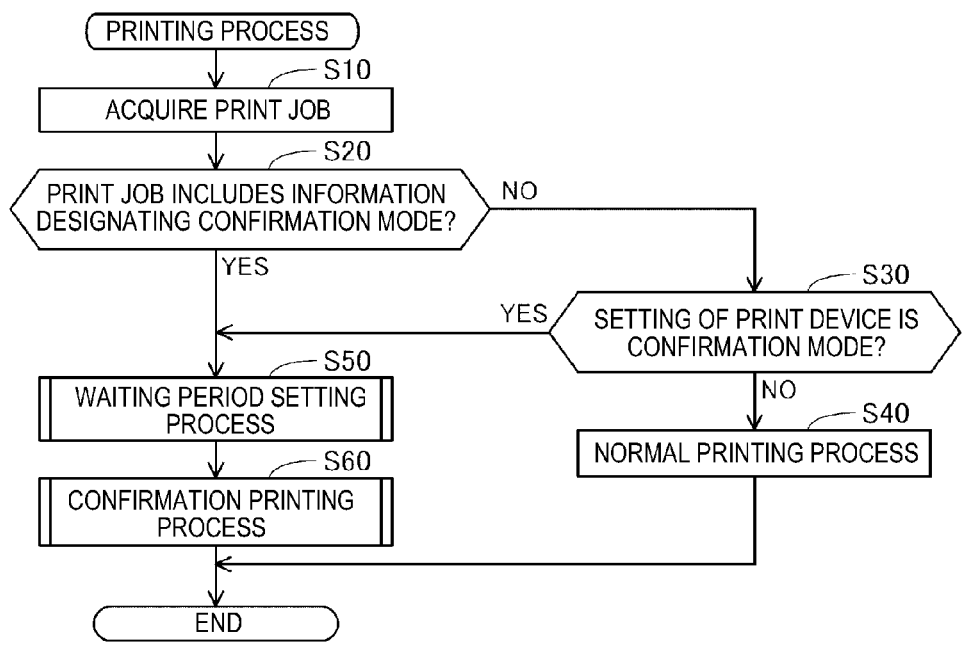
FIG. 3 is a flowchart of a printing process according to the first illustrative embodiment.

FIG. 3 is a flowchart of a printing process according to the first illustrative embodiment. The printing process is performed by the device control section 100 when the communication section 270 of the print device 200 receives the print job from the computers 300 and 400 through the network.

In step S10, the device control section 100 acquires the print job received by the communication section 270. The print job includes a control data and an image data indicating an image to be printed corresponding to one page or plural pages. In this illustrative embodiment, the image data included in the print job is described using a page description language such as PostScript, PDF, or XPS. The control data is information referenced when the device control section 100 executes the printing, and includes information specifying a sheet size, and information specifying the number of copy units. Also, the control data may include the above-described user designation information.

In step S20, the mode selection unit 130 determines whether the print job includes the user designation information designating the confirmation mode as the print mode. If the print job does not include the user designation information designating the confirmation mode (NO in step S20), the mode selection unit 130 determines whether the print mode is set as the confirmation mode in the user setting with reference to the user set data 233 of the print device 200 (step S30). If the print mode is not set as the confirmation mode (NO in step S30), the device control section 100 executes the printing (normal printing process) in the normal mode (step S40), and terminates the process.

If the print job includes the user designation information designating the confirmation mode (YES in step S20), or if the print mode is set as the confirmation mode in the user setting of the print device 200 (YES in step S30), the device control section 100 shifts to the process (steps S50 and S60) of executing the printing based on the print job in the confirmation mode.

Figure 4:
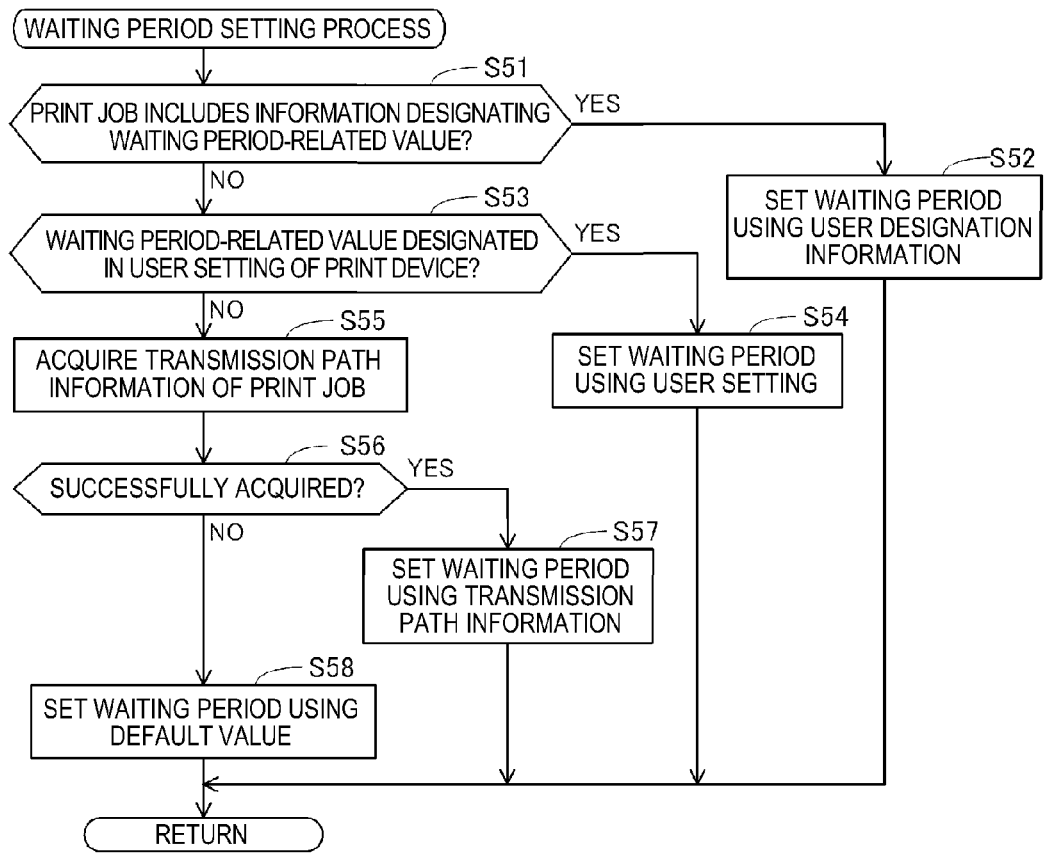
FIG. 4 is a flowchart of a waiting period setting process.

In step S50, the delay period setting unit 140 executes a waiting period setting process. FIG. 4 is a flowchart of the waiting period setting process. In step S51, the delay period setting unit 140 determines whether the print job (control data) includes the user designation information designating the waiting period-related values. If the print job includes the user designation information to designate the waiting period-related values (YES in step S51), the delay period setting unit 140 uses the user designation information, and sets the waiting period (step S52). Specifically, the delay period setting unit 140 sets the waiting period for one or plural waiting period set pages of the print pages to be printed based on the currently processed print job using the waiting period-related values (initial value T0 and the number of waiting pages WN) designated by the user designation information, respectively.

Figure 5:
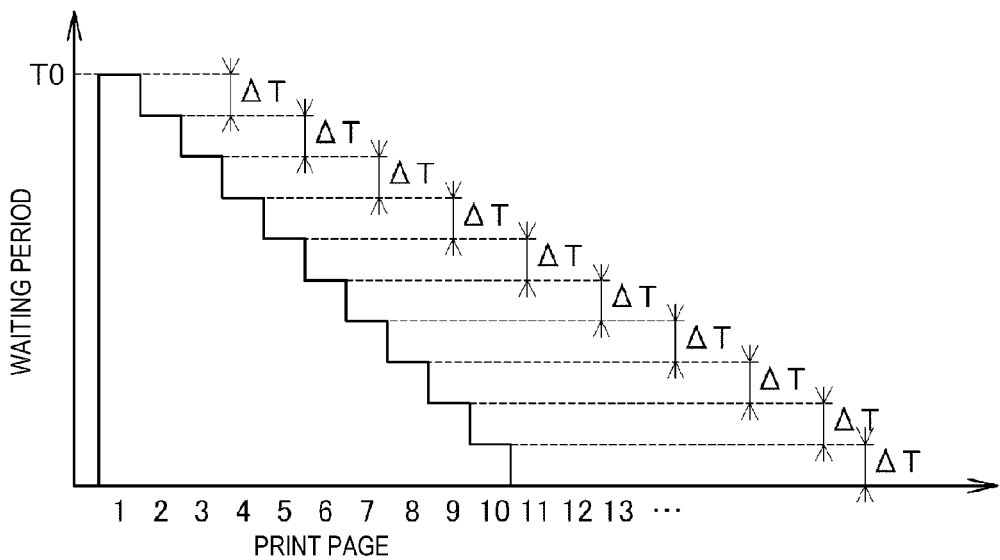
FIG. 5 is a diagram explaining a setting of a waiting period.

FIG. 5 is a diagram explaining the setting of the waiting period. FIG. 5 shows a waiting period set to each waiting period set page included in pages printed based on a print job when the number of waiting pages WN is 10. If the total value of the print pages is larger than the number of waiting pages WN, the waiting period set page is each page from the first page to the WN-th page (tenth page in the example in FIG. 5) among all print pages. In this instance, the waiting period is not set to print pages after (WN+1)-th page. In the example of FIG. 5, the waiting period is set to each page to be printed from the first page to the tenth page, and the waiting period is not set to print pages after the eleventh page. If the total value of print pages is equal to or smaller than the number of waiting pages WN, the waiting period set page is all pages except for the last page. Also, if the total value of print page is 1, the waiting period is not set. As can be appreciated from the above description, the waiting period is not set for the last page, irrespective of the total value of print pages.

Herein, the waiting period set to the k-th print page is T(k) (k is a natural number not larger than WN). The waiting period T(k) is represented by Equation 1 below.

$$T(k)=T0-(k-1)\times\Delta T(\Delta T=T0/WN) \quad 1$$

The period from the start of printing of the k-th page to the start of printing of (k+1)-th page is extended by the waiting period T0−(k−1)×ΔT.

As can be appreciated from Equation 1 and FIG. 5, the waiting period T(k) is shortened by an increment ΔT, whenever the page number k of the waiting period set page is increased by one. That is, in the page range of which the waiting period T(k) is set, as the page number k is increased, the set waiting period T(k) is set to be shortened step by step. The waiting period T(1) set to the first print page is the initial value T0, and the waiting period T(WN) set for the WN-th print page is ΔT. For example, if the initial value T0=40 (seconds) and the number of waiting pages WN=10, since ΔT=4 (seconds), (T(1), T(2), T(3), ... (omission) ..., T(9), T(10))=(40, 36, 32, ... (omission) ..., 8, 4 (seconds)).

If the print job does not include the user designation information designating the waiting period-related values (NO in step S51), the delay period setting unit 140 determines whether the waiting period-related values are designated in the user setting with reference to the user set data 233 (step S53). If the waiting period-related values are designated in the user setting (YES in step S53), the delay period setting unit 140 uses the waiting period-related values designated in the user setting, and sets the waiting period T(k) (step S54). The specific method of setting the waiting period T(k) is similar to the method (see FIG. 5) for setting the waiting period T(k) using the waiting period-related values designated by the user designation information included in the print job.

If the waiting period-related values are not designated in the user setting (NO in step S53), the delay period setting unit 140 acquires transmission path information of the print job (step S55). Specifically, the number of hops HN is acquired as the transmission path information. The number of hops HN is a value representing the number of routers, through which the print job passes, in the transmission path of the print job from a source computer to the print device 200. For example, if a source computer is the computer 300 in FIG. 1, the number of hops HN acquired is 0. If a source computer is the computer 400 in FIG. 1, the number of hops HN acquired is 1. The delay period setting unit 140 can acquire the number of hops HN, for example, using a known command (e.g., a "tracert" command in Windows (trademark) or a "traceroute" command in UNIX (trademark)) for acquiring a communication path of the network. Also, if an initial value of TTL (time to live) described in an IP header of the print job is recognized in advance, the delay period setting unit 140 may acquire a difference between the value of the TTL described in the IP header of the received print job and its initial value as the number of hops IIN.

In step S56, the delay period setting unit 140 determines whether the transmission path information (specifically, the number of hops HN) is successfully acquired. If the transmission path information is successfully acquired (YES in step S56), the delay period setting unit 140 sets the waiting period T(k) using the transmission path information (step S57). Specifically, the delay period setting unit 140 determines the waiting period-related values with reference to the number of hops HN as the transmission path information and the delay period data 232.

FIG. 6 is a diagram illustrating an example of the delay period data 232. The delay period data 232 includes a first data A1 defining correspondence between the number of hops HN and the waiting period-related values, and a second data A2 defining a default value of the number of waiting pages WN and the initial value T0 of the waiting period. In the first data A1 in FIG. 6, combinations of six kinds of the initial value T0 and the number of waiting pages WN are recorded as the six kinds of waiting period-related values respectively corresponding to six kinds of the number of hops TIN from 0 to 5. In the example in FIG. 6, if the number of hops HN acquired as the transmission path information is 2, the delay period setting unit 140 determines 30 as the initial value T0, and 5 as the number of waiting pages WN, respectively.

Then, the delay period setting unit 140 sets the waiting period T(k) using the waiting period-related values determined with reference to the delay period data 232. The specific method for setting the waiting period T(k) is similar to the method described with reference to FIG. 5.

If the transmission path information is not acquired (NO in step S56), the delay period setting unit 140 determines the default value recorded in the second data A2 of the delay period data 232 as the waiting period-related values, and sets the waiting period T(k) using the default value (step S58). In the example in FIG. 6, the delay period setting unit 140 determines 40 as the initial value T0, and 10 as the number of waiting pages WN, respectively, in the waiting period-related values. Also, the method for setting the waiting period T(k) using the determined waiting period-related value (default value) is similar to the method described with reference to FIG. 5.

In the above-described steps S52, S54, S57 and S58, if the waiting period T(k) is set, the waiting period setting process is completed. If the waiting period setting process is completed, the device control section 100 executes the confirmation printing process in step S60 of FIG. 3.

Figure 7:
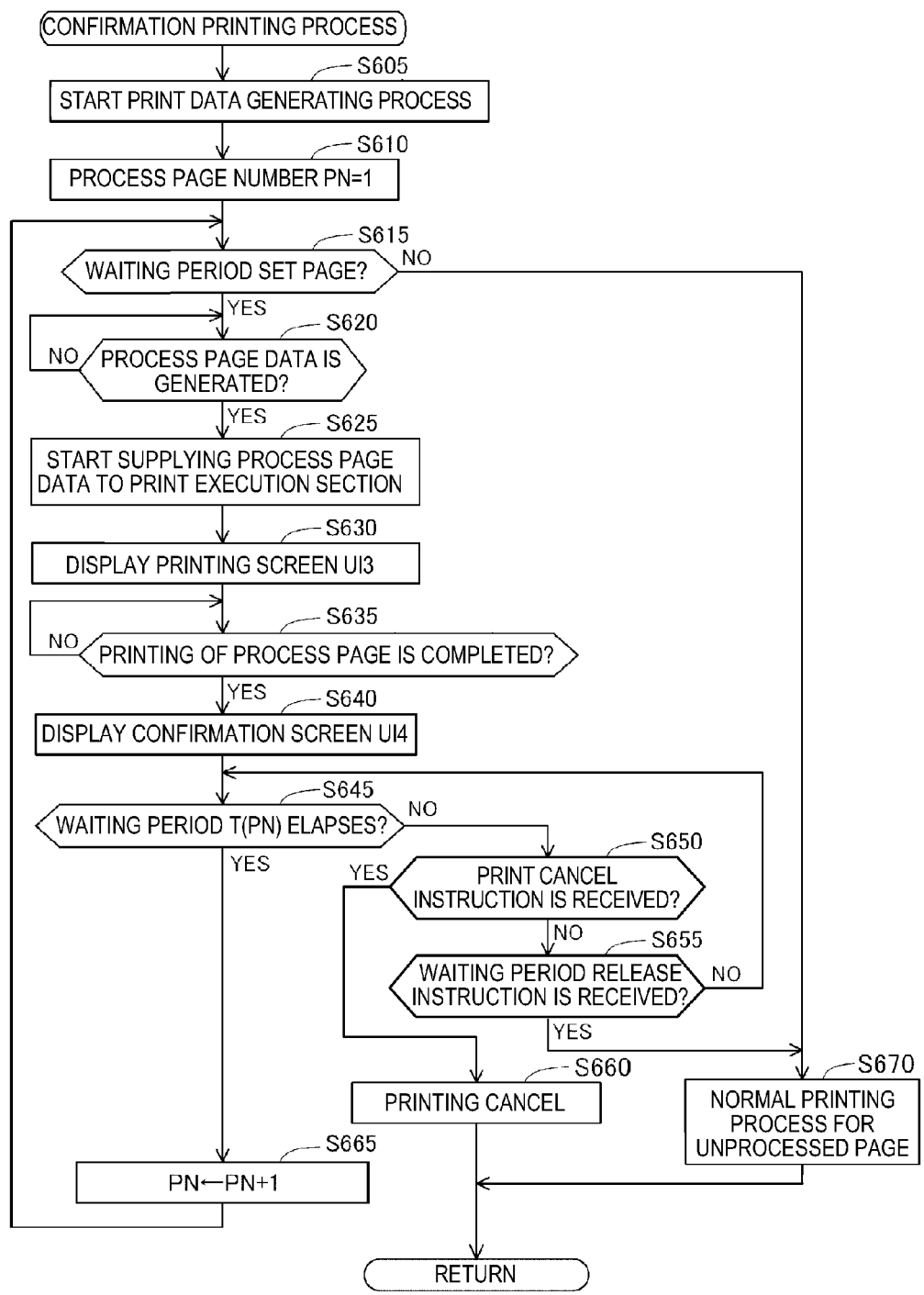
FIG. 7 is a flowchart of a confirmation printing process.

FIG. 7 is a flowchart of the confirmation printing process.

In step S605, the print data acquisition unit 110 starts a print data generating process of generating the print data to be supplied to the print execution section 240 by using the image data included in the print job. The generated print data includes page data as many as the number of pages to be printed based on the print job. Each page data is dot data indicating a forming state of the dot which should be formed by toner, for every pixel constituting the print image of the corresponding page. In the print data generating process, the print data acquisition unit 110 rasterizes the image data described by the page description language for every page to generate raster data of which a pixel value is an RGB value. The print data acquisition unit 110 executes a color converting process (specifically, RGB-CMYK converting process) using a lookup table for plural pixel values (RGB value) constituting the raster data of each page. The print data acquisition unit 110 executes a half-toning process for the plural pixel values after the color converting process, thereby generating the print data.

In this instance, the print data generating process described in this step is performed parallel with the process after step S610 in the order of the pages to be printed until the page data for all print pages are generated. The generated page data is sequentially stored in the volatile storage device 220, and in the process after step S610, the page data corresponding to the pages of which the printing is completed is deleted. If all page data cannot be stored in the volatile storage device due to capacity shortage, the print data generating process is temporarily stopped until the capacity shortage is solved by deleting the page data corresponding to the page of which the printing is completed.

In step S610, the print control unit 120 sets a process page number PN specifying the process page as the initial value 1. In step S615, it is determined whether the process page specified by the process page number PN is the waiting period set page.

If the process page is the waiting period set page (YES in step S615), the print control unit 120 determines whether generation of the page data (also referred to as process page data) indicating the print image of the process page is completed (step S620). If the generation of the page data is not completed (NO in step S620), the print control unit 120 stands by until the generation of the page data is completed. If the generation of the page data is completed (YES in step S620), the print control unit 120 starts supplying the process page data, of which generation is completed, to the print execution section 240 (step S625). The print execution section 240 starts printing using the process page data, if the process page data is supplied.

Figure 8A:
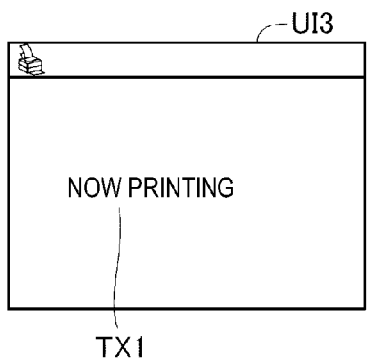
FIGS. 8A and 8B are diagrams illustrating examples of a display screen.
Figure 8B:
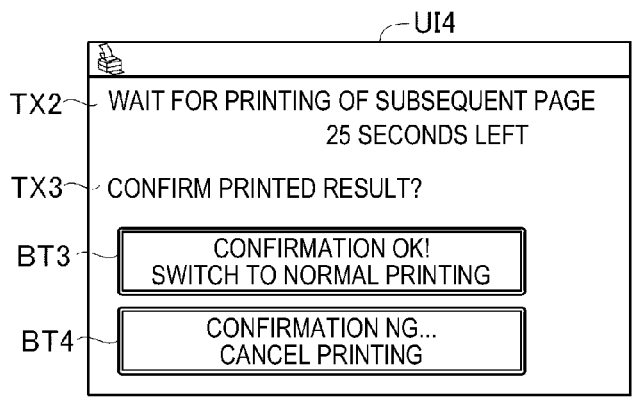

In step S630, the device control section 100 displays a printing screen UI3 on the display section 250. FIGS. 8A and 8B are diagrams illustrating examples of the display screen. As illustrated in FIG. 8A, the printing screen UI3 includes a display (text TX1) for notifying the user of "now printing".

In step S635, the print control unit 120 determines whether the printing (printing using the process page data) of the process page by the print execution section 240 is completed. The print control unit 120 may determine that the printing of the process page is completed if a predetermined print duration elapses from the completion of the supply of the process page data to the print execution section 240, or may determine that the printing of the process page is completed if a print finish notification is received from the print execution section 240.

If the printing of the process page is completed (YES in step S635), the device control section 100 displays a confirmation screen UI4 (FIG. 8B) on the display section 250, instead of the printing screen UI3 (step S640). That is, the above-described printing screen UI3 is displayed on the display section 250 between the start and the finish in the printing of the process page by the print control unit 120. The confirmation screen UI4 is displayed on the display section 250 between the completion of the printing of the process page and the start of the printing of the subsequent process page.

As illustrated FIG. 8B, the confirmation screen UI4 includes a display (text TX2) for notifying the user of a waiting period which waits for the printing of the next page, and a display (text TX3) for prompting the user to confirm the printed result of the pages printed. Also, the confirmation screen UI4 includes two instruction buttons BT3 and BT4 through which the user inputs instruction for the printing based on the confirmation of the printed result. The first instruction button BT3 is a GUI (graphical user interface) for receiving a continuation instruction to switch the printing based on the print job in process to the normal mode and continue it. When receiving the continuation instruction, as described later, since it is switched to the normal mode in which the waiting period T(k) set in the waiting period setting process (FIG. 4) is not used (since the setting of the waiting period T(k) is released), the continuation instruction is referred to as a waiting period release instruction. The release reception unit 160 receives the waiting period release instruction from the user through the first instruction button BT3 while the confirmation screen UI4 is displayed. The second instruction button BT4 is a GUI for receiving the print cancel instruction to instruct the user to cancel the printing based on the print job in process. The print cancel reception unit 150 receives a print cancel instruction from the user through the second instruction button bT4 while the confirmation screen UI4 is displayed.

During printing, the waiting period release instruction and the print cancel instruction may be received by displaying the confirmation screen UI4, instead of the printing screen UI3. However, in this case, the text TX2 of the confirmation screen UI4 is preferably changed to display wording (e.g., TX1 in UI3) indicating the printing.

In step S645, the print control unit 120 determines whether the waiting period T(PN) set for the process page elapses after the printing of the process page is completed. If the waiting period T(PN) does not elapse (NO in step S645), the print cancel reception unit 150 determines whether the print cancel instruction is received from the user (step S650).

If the print cancel instruction is received from the user (YES in step S650), the print control unit 120 cancels the printing (step S660), and terminates the process. Accordingly, in this instance, the printing of the subsequent page (page after (PN+1)-th page) after the process page is not performed.

If the print cancel instruction is not received by the print cancel reception unit 150 (NO in step S650), the release reception unit 160 determines whether the waiting period release instruction is received from the user (step S655). If the waiting period release instruction is not received by the release reception unit 160 (NO in step S655), the print control unit 120 returns to step S645, and then determines whether the waiting period T(PN) elapses.

If the waiting period release instruction is received by the release reception unit 160 (YES in step S655), the print control unit 120 performs the printing of the unprocessed page, that is, the printing after the next page of the process page among the pages printed based on the print job, in the normal printing process (step S670). Specifically, the print control unit 120 progresses the printing by sequentially supplying the generated page data to the print execution section 240 in order. If the printing (printing using the page data to be processed at the last among one or plural page data included in the print data) of the last page is completed, the confirmation printing process (FIG. 7) and the printing process (FIG. 2) are completed.

If the waiting period T(PN) elapses (YES in step S645), the print control unit 120 sets a new process page by incrementing the process page number PN (step S665), and then returns to step S615.

If the process page is not the waiting period set page (NO in step S615), the print control unit 120 performs the printing of the unprocessed pages, that is, the printing of pages after the process page among the pages printed based on the print job, in the normal printing process (step S670). As described above, if the total value of the print pages is larger than the number of waiting pages WN, the print pages which are not the waiting period set page are the print pages after the (WN+1)-th page. Also, if the total value of the print pages is smaller than the number of waiting pages WN, the print page which is not the waiting period set page is the last page. Accordingly, those print pages are printed by the normal printing process. Since the last page is always not the waiting period set page, the printing of the last page is certainly performed by the normal printing process. When the printing of the last page is completed, the confirmation printing process (FIG. 7) and the printing process (FIG. 2) are completed.

FIG. 9A is a timing chart of the printing in the confirmation mode and FIG. 9B is a timing chart of the printing in the normal mode, according to the first illustrative embodiment. As illustrated in FIG. 9A, in the printing (step S60 in FIG. 3, and FIG. 7) of the above-described confirmation mode, the print control unit 120 controls the period from the completion of the printing of the k-th page to the start of the printing of (k+1)-th page as the waiting period T(k) as long as the print cancel instruction or the waiting period release instruction is not received. In contrast, as illustrated in FIG. 9B, in the printing (step S40 in FIG. 3) of the normal mode, the waiting period T(k) is not set from the completion of the printing of the k-th page to the start of the printing of (k+1)-th page. Accordingly, in the printing of the normal mode, plural pages are sequentially printed, without providing a substantial interval, as long as a delay is not created at the formation of the page data by the print data generating process.

As can be appreciated from the above description, the period (referred to as a print interval IT(k). See FIG. 9A) from the start of the printing of the k-th page, to which the waiting period T(k) is set, to the start of the printing of (k+1)-th page is extended from the print interval IT(k) (see FIG. 9B) of the k-th page, to which the waiting period T(k) is not set. For example, if the time required for the printing of each page is equal to each other, the print interval IT(k), to which the waiting period T(k) is set, is extended by the waiting period T(k) from the print interval IT(k) to which the waiting period is not set.

As can be appreciated from the above description, the waiting period T(k) of the first illustrative embodiment is an example of a delay period. Also, for example, the print interval IT(1) (=PT+waiting period T(1) supposing that the time required for the printing of one page is PT) from the start of the printing of the first page to the start of the printing of the second page is an example of the first period. The print interval IT(2) (=PT+waiting period T(2)) from the start of the printing of the second page to the start of the printing of the third page is an example of the second period. The print interval IT(3) (=PT+waiting period T(3)) from the start of the printing of the third page to the start of the printing of the fourth page is an example of the third period.

As can be appreciated from the above description, according to the printing of the confirmation mode, as the waiting period T(k) is set, the start of the printing after the second page is delayed, as compared with the printing of the normal mode. For example, in the printing of the confirmation mode, it would be seen from FIGS. 9A and 9B that the period from the start of the printing of the first page to the start of the printing of each of the second, third, and fourth pages is delayed by T(1), T(1)+T(2), and T(1)+T(2)+T(3), respectively, as compared with the printing of the normal mode. Accordingly, in the case where the printed result of the printed page (e.g., the first page) is different from the intention of the user, it is possible to decrease the possibility that pages after the second page is printed by the print cancel instruction received from the user. As a result, the unnecessary or unintentional printing is decreased, so that the convenience of the printing can be improved. For example, if the print cancel instruction is received at the time Ts illustrated in FIGS. 9A and 9B, the unnecessary printing performed differently from the intention of the user is two pages (first page and the second page) in the printing of the confirmation mode, but is five pages (first to fifth pages) in the printing of the normal mode.

In addition, for the plural waiting period set pages, the smaller waiting period T(k) is set as the page number k is larger (that is, the order to be processed is later). That is, T(1)>T(2)> . . . >T(WN). Accordingly, the print interval IT(k) is smaller as the page number k is larger. That is, in the printing of the confirmation mode, if the print cancel instruction is not issued during printing, the print interval IT(k) is IT(1)>IT(2)> . . . >IT(WN). The configuration is employed due to the fact that, in relatively many cases, a mistake in print setting which may be a cause of the print cancel, such as a mistake in setting format and a mistake in setting paper size, can be found once the user confirms the printed result of the relatively small number of pages (e.g., one page). Accordingly, it is considered that the possibility that the user cancels the printing is higher as the printing is an early stage, and is lower as the printing proceeds. According to the printing of the confirmation mode, as the possibility that the printing is canceled is higher, the print interval IT(k) is set to be longer, as compared with the case where the possibility is lower. As a result, while the unnecessary printing is decreased, it is possible to suppress the time required for the whole printing from being excessively extended. Therefore, the convenience of the printing can be further improved.

The waiting period T(k) is set to be shortened by the increment ΔT whenever the page number k is increased by 1 (FIG. 5). And, ΔT=T0/WN (WN is the number of waiting pages, and T0 is an initial value of the waiting period). Accordingly, if the number of waiting pages WN is constant, the increment ΔT is increased as the initial value T0 is larger. That is, a difference (=ΔT) between a length of the print interval IT(k) and a length of the print interval IT(k+1) is set to be increased, as the waiting period T(1) set for the first page is long. As a result, since the time required for the whole printing is prevented from being excessively long, the convenience of the printing can be improved.

As illustrated in FIG. 9A, before the waiting period T(k) elapses after the printing of the k-th page is completed, the print control unit 120 is switched to the normal mode from the confirmation mode if the waiting period release instruction is received. As a result, before the waiting period T(k) set for the k-th page elapses, the printing of the (k+1)-th page starts. Accordingly, for example, in the case where the user wants that the whole printing based on the print job is completed early after the user confirms that the printed result is consistent with the user's intention, the time required for the whole printing can be shortened by inputting the waiting period release instruction through the confirmation screen UI4 (FIG. 8B). As a result, the convenience of the printing can be further improved.

In the case where the total value of the print pages is larger than the number of waiting pages WN, the waiting period T(k) is not set for the page to be printed after (WN+1)-th page. Also, the waiting period T(k) is not set for the last page, irrespective of the total value of the page to be printed. As a result, in the case where the last page is printed, the print control unit 120 does not execute the period control using the waiting period T(k). The configuration is employed due to the fact that the possibility that the print cancel instruction is received from the user is low in the case where the final page is printed. In the printing of the confirmation mode, the printing is not delayed in the case where the last page is not printed. Accordingly, the time required for the printing can be shortened.

In addition, the mode selection unit 130 selects the print mode in accordance with the user designation information included in the print job, and the user set data 233 of the print device 200 (FIG. 3). That is, the mode selection unit 130 selects any one of the normal mode and the confirmation mode according to the instruction of the user. The print control unit 120 executes the control (referred to as period control) of the print period IT(k) using the waiting period T(k) in the case where the confirmation mode is selected, and does not execute the period control using the waiting period T(k) in the case where the normal mode is selected. As a result, since the proper printing is performed according to the selection of the user, the convenience of the printing can be further improved.

The delay period setting unit 140 sets the waiting period T(k) in accordance with the user designation information included in the print job, and the user set data 233 of the print device 200 (FIG. 4). That is, the delay period setting unit 140 selects the waiting period T(k) according to the instruction of the user. Accordingly, since the user selects the desired waiting period T(k), the convenience of the printing can be further improved.

The delay period setting unit 140 selects the waiting period T(k) using the transmission path information (specifically, the number of hops HN) in the case where the waiting period-related values are not selected in the user designation information and the user set data 233 (FIGS. 4 and 6). The number of hops HN may be information on the distance between the print device 200 and the computers 300 and 400 which are transmission sources of the print job. As the distance between the print device 200 and the computers 300 and 400 which are the transmission sources of the print job is longer, the possibility that the confirmation of the printed result by the user is delayed is higher. Since the delay period setting unit 140 can set the proper waiting period T(k) using the number of hops HN, the convenience of the printing can be further improved.

B. Second Illustrative Embodiment

B-1. Configuration of Print System

Figure 10:
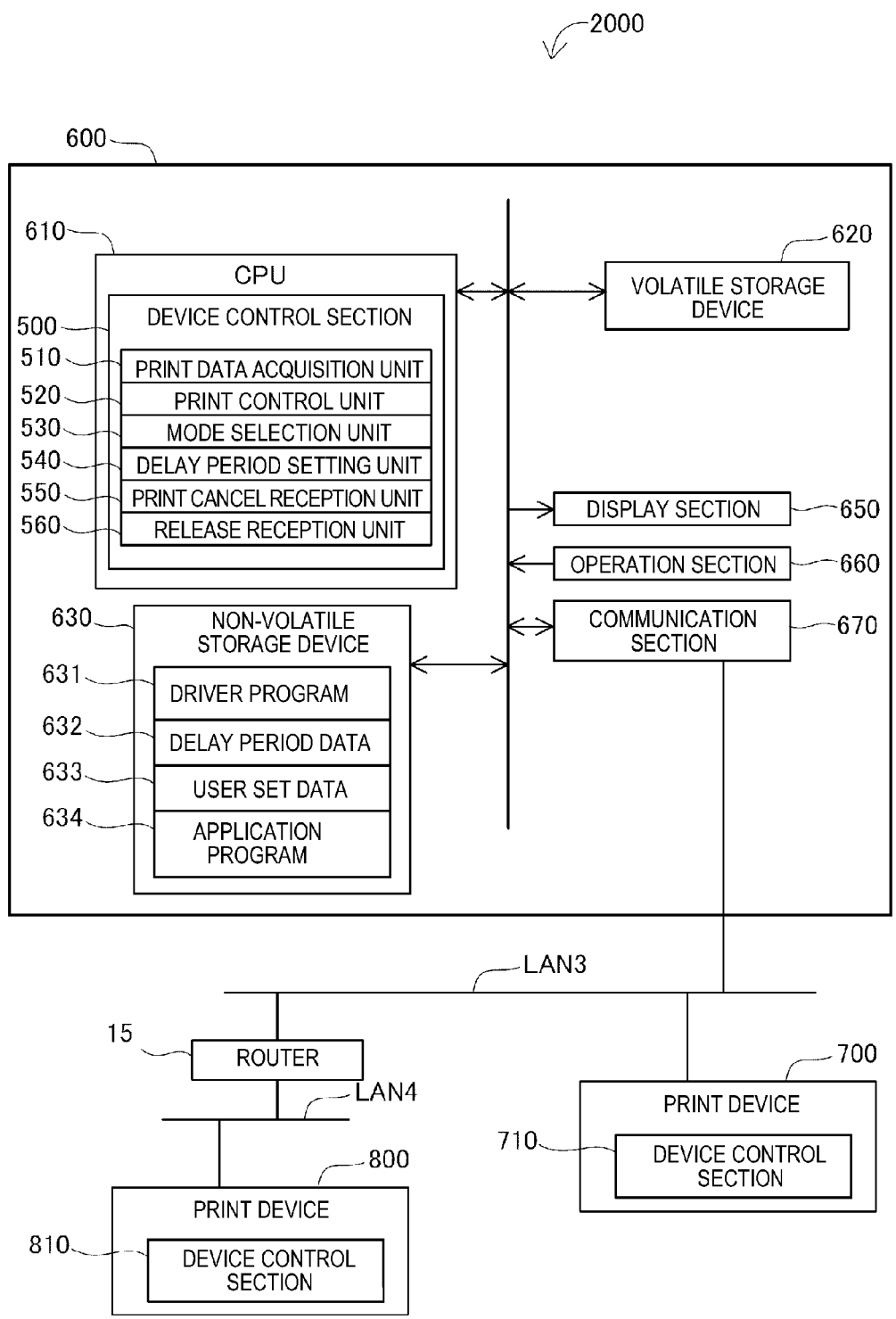
FIG. 10 is a block diagram illustrating the configuration of a print system according to a second illustrative embodiment.

FIG. 10 is a block diagram illustrating the configuration of a print system according to a second illustrative embodiment. A print system 2000 includes a computer 600, print devices 700 and 800. The computer 600 is communicably connected to the print device 700 via a local area network LAN3. Also, the computer 600 is communicably connected to the print device 800 via the local area network LAN 3, a router 15, and a local area network LAN4.

The computer 600 includes a CPU 610, a volatile storage device 620 such as a RAM, a non-volatile memory device 630 such as a hard disc or a flash memory, a display section 650 such as a liquid crystal panel, an operation section 660 having a keyboard or a mouse, and a communication section 670 having an interface to be connected to the network.

The volatile storage device 620 provides a buffer region for the CPU 610. The non-volatile memory device 630 is stored with a driver program 631, a delay period data 632 and a user set data 633 which are same as those of the first illustrative embodiment, and an application program 634 for document generation or drawing generation. The driver program 631 or the delay period data 632 may be stored, for example, in a CD-ROM, and provided to the user.

The CPU 610 executes the driver program 631 to function as a printer driver 500 for instructing the print devices 700 and 800 to execute the printing. The printer driver 500 includes a plurality of function units having the same names as the plurality of function units 110 to 160 provided in the device control section 100 of the first illustrative embodiment. The is, the printer driver 500 includes a print data acquisition unit 510, a print control unit 520, a mode selection unit 530, a delay period setting unit 540, a print cancel reception unit 550, and a release reception unit 560. The process executed by the respective function units 510 to 560 is substantially same as those of the respective function units 110 to 160 having the same name provided in the device control section 100 of the first illustrative embodiment, and therefore, the process will be described on the basis of the difference thereof.

The print devices 700 and 800 are an inkjet printer capable of forming an image using ink of plural colors (e.g., four colors of CMYK) as a print material (consumable material). That is, the print devices 700 and 800 include an ink discharge mechanism, a main scanning mechanism, and a transport mechanism (not illustrated). The transport mechanism transports the sheet (sub-scanning) in a sub-scanning direction by a driving force of a transport motor. The main scanning mechanism reciprocates a print head (main scanning) in a main scanning direction by a driving force of a main scanning motor. The ink discharge mechanism includes a print head and a head driver for driving the print head, and forms an image by discharging the ink from the print head onto the sheet in synchronization with the main scanning of the print head by the main scanning mechanism. The print devices 700 and 800 include device control sections 710 and 810. If the device control sections 710 and 810 receive the print data from the printer driver 500 of the computer 600, the device control sections control each of the above-described mechanisms in accordance with the received print data to execute the printing by alternatively repeating the main scanning and the sub-scanning.

B-2. Printing Process

Figure 11:
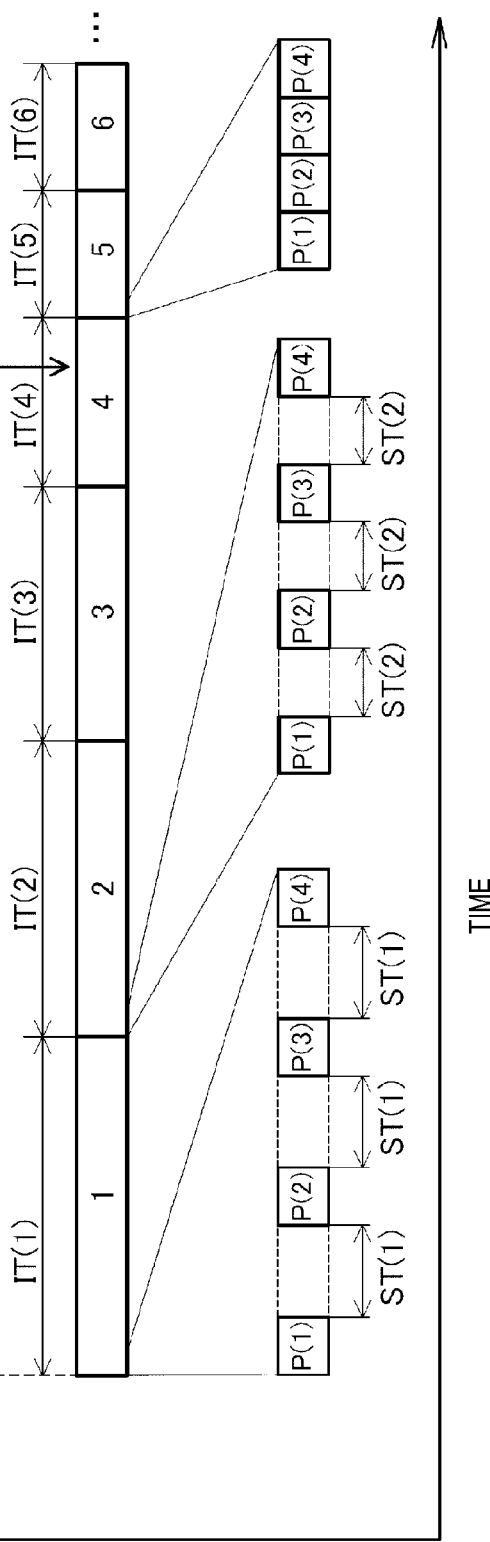
FIG. 11 is a timing chart of printing in a confirmation mode according to the second illustrative embodiment.

In the second illustrative embodiment, the following description is based on the assumption that the user instructs the computer 600 to transmit the print job to either one of the print devices 700 and 800. FIG. 11 is a timing chart of printing of a confirmation mode according to the second illustrative embodiment. Although the printing process (FIG. 3) is performed by the device control section 100 of the print device 200 in the first illustrative embodiment, the printing process is performed by the printer driver 500 of the computer 600 in this illustrative embodiment. Since the detailed process contents of the printing process according to the second illustrative embodiment are substantially same as those of the first illustrative embodiment, the following description is based on the difference thereof. The printer driver 500 starts the printing process in accordance with the instruction (print instruction) of the user.

In the confirmation mode of the second illustrative embodiment, differently from the first illustrative embodiment, the period from the start of the printing of the k-th page to the start of the printing of the (k+1)-th page is controlled by setting a predetermined main scanning stop period ST(k) once in each of R times of main scanning which is performed when the k-th page is printed. That is, the printer driver 500 sets the main scanning stop period ST(k) between q times of main scanning P(q) and (q+1) times of main scanning P(q+1) (q is a natural number less than R). As a result, the period from the start of the printing of the k-th page to the start of the printing of the (k+1)-th page is extended by (R−1) times of the main scanning stop period ST(k), as compared with the case in which the main scanning stop period ST(k) is not set. An example using the case where the printer driver 500 instructs the print device 700 to execute the printing will be described below.

First, the print data acquisition unit 510 acquires the image data to be printed from the application program 634. The image data is displayed in a different format for each application program generating the image data. The print data acquisition unit 510 sequentially executes a rasterizing process, a color converting process, and a half-toning process for the acquired image data to generate print data including one or plural page data. The print data acquisition unit 510 arranges the print data in order which is used in the main scanning, if necessary, according to a print manner to be used (e.g., non-interlacing printing or two-pass or four-pass interlacing printing), and then alters the print data.

The print control unit 520 transmits the print data to the print device 700 sequentially from the first page data. In the confirmation mode of the second illustrative embodiment, for example, the print control unit 520 transmits sequentially each data according to an amount required for, for example, one main scanning among the page data of the k-th page to the print device 700 at an interval corresponding to the main scanning stop period ST(k). If the device control section 710 of the print device 700 receives the pass data, the device control section immediately executes the corresponding main scanning. As a result, under the control of the print control unit 520, the main scanning is stopped as much as the main scanning stop period ST(k) whenever the print device 700 performs one main scanning. This configuration is advantageous in that it is not necessary for the print device 700 to specifically deal with the confirmation mode. Instead of the above configuration, the print control unit 520 may transmit a main scanning stop instruction designating the length of the main scanning stop period ST(k) to the print device 700 with the page data. In this instance, the device control section 710 of the print device 700 stops the main scanning whenever one main scanning is performed, in accordance with the main scanning stop instruction. This configuration is advantageous in that although the print device 700 needs to deal with the main scanning stop instruction, the print device 700 can control the main scanning stop period ST(k) with high precision, since it is not affected by the communication state of the network or the like.

In the normal mode, the print control unit 520 transmits sequentially the pate data to be printed to the print device 700, without leaving the interval of transmission and including the main scanning stop instruction. As a result, the print device 700 executes the printing in accordance with the page data, without intentionally stopping the main scanning.

The printer driver 500 receives the instruction to select the print mode from the user, similarly to the first illustrative embodiment. If the instruction to select the print mode is received before the printing is performed, the mode selection unit 530 selects the print mode in accordance with the selection instruction. If the selection instruction is not received, the mode selection unit 530 selects a default print mode.

When the printing process is performed in the print mode, similarly to the setting of the waiting period-related values in the first illustrative embodiment, the delay period setting unit 540 sets a main scanning stop period-related values, specifically, an initial value ST0 of the main scanning stop period and the number of stop pages SN prior to the printing. For example, if the designation of the main scanning stop period-related values is received from the user, the delay period setting unit 540 sets the main scanning stop period-related values in accordance with the designation. Also, if the designation is not received, the delay period setting unit 540 sets transmission path information (e.g., the number of hops) from the computer 600 to the print device 700 with reference to the delay period data 632, or the main scanning stop period-related values based on the default value. The delay period setting unit 540 sets the shorter main scanning stop period ST(k) for each page before (1+SN)-th page, as the page number k is larger, similar to the waiting period T(k) in the first illustrative embodiment.

While the printing is performed in the confirmation mode, similarly to the first illustrative embodiment, the print cancel reception unit 550 receives the print cancel instruction from the user, and release reception unit 560 receives the main scanning stop period instruction from the user. These instructions is executed by, for example, displaying the same screen as the confirmation screen UI4 (FIG. 8B) on the display section 650. However, it is preferable that the text TX2 in FIG. 8B is appropriately changed to display wording (e.g., TX1 in UI3) displaying, for example, the "now printing". In the case where these instructions are received, similarly to the first illustrative embodiment, the print control unit 520 cancels the printing and then switches into the normal mode (release of the main scanning stop period ST(k)), in accordance with the instruction. In this instance, if the print cancel instruction is received, the print control unit 520 immediately stops the transmission of the print data (pass data), and notifies the print device 700 of the print cancel. The device control section 710 of the print device 700 receiving the notification of the print cancel immediately stops the printing, without completing the printing of the paper being printed, for example, and performs the discharge of the sheet.

As can be appreciated from the above description, the print device 700 and the print device 800 according to the second illustrative embodiment are one example of a print execution section, and the main scanning stop period ST(k) is one example of the delay period. Also, for example, the print interval IT(1) (supposing that the time required for the printing of one page is PT and times of the main scanning near one page is R, PT+(R−1)×main scanning stop period ST(1)) from the start of the printing of the first page to the start of the printing of the second page is an example of the first period. The print interval IT(2) (=PT+(R−1)×main scanning stop period ST(2)) from the start of the printing of the second page to the start of the printing of the third page is an example of the second period. The print interval IT(3) (=PT+(R−1)×main scanning stop period ST(3)) from the start of the printing of the third page to the start of the printing of the fourth page is an example of the third period.

According to the above-described second illustrative embodiment, the printing is performed in the confirmation mode by the control of the computer 600 (printer driver 500), differently from the control by the print device 200 in the first illustrative embodiment. As a result, the same operation and effect as the first illustrative embodiment can be achieved.

In addition, according to the printer driver 500 of the second illustrative embodiment, the period from the start of the printing using the k-th page data to the start of the printing using the (k+1)-th page data is controlled (intentionally delayed) by use of the main scanning stop period ST(k) set for every main scanning included in the printing of the k-th page. Accordingly, it is possible to further effectively suppress unnecessary consumption of the print material (ink in this illustrative embodiment). In the print device of an inkjet type, there are many cases of including the structure capable of confirming the printed result to the middle of printing while printing the page corresponding to one page. In this case, there is a case where the user can find a setting mistake in print format or the like at the time of confirming the printed result of the middle of the page. In the second illustrative embodiment, since the main scanning stop period ST(k) is set, the whole printing corresponding to one page is performed for a relatively long time. As a result, if the setting mistake is found in the middle of the printing page, the user can cancel the printing before the printing of the page is completed. Therefore, as compared with the case where the printing of the page is completed, it is possible to suppress the useless consumption of the print material.

C. Variations (1) In the confirmation mode of the first illustrative embodiment, for the plural waiting period set pages, as the page number k is higher (that is, the order to be processed is later), the shorter waiting period T(k) is set. However, a same waiting period T(k) may be set to the plural waiting period set pages. In this instance, the period from the start of the printing of the last page (WN-th page) of the waiting period set page to the start of the printing of the (WN+1)-th page (the first page to which the waiting period T(k) is set) is an example of the first period. The period from the start of the printing of the (WN+1)-th page to the start of the printing of the (WN+2)-th page is an example of the second period. This also similarly applies to the length of the main scanning stop period ST(k) in the second illustrative embodiment.

(2) Although the print device 200 executes the conversion process (rasterizing process) for the image data included in the print job to generate (acquire) the print data in the first illustrative embodiment, the conversion process may be performed by a computer (computer 300 or the like) of a transmission source of the print job. In this instance, the print data acquisition unit 110 receives the print data of converted print data from the computer to acquire the print data.

(3) In the second illustrative embodiment, the printer driver 500 (print data acquisition unit 510) executes the conversion process (rasterizing process or the like) for the image data acquired from the application program 634 to generate (acquire) the print data. Instead, the conversion process may be performed by a transmission side (print device 700 or the like) of the print data. In this instance, the image data prior to the conversion process is an example of the print data to be acquired by the print data acquisition unit 510. In this instance, for example, the print control unit 520 may transmit the main scanning stop instruction designating the length of the main scanning stop period ST(k) to the print device 700 to control the print interval between the pages.

(4) Although each illustrative embodiment is described with reference to the example in which the printing is based on the print job transmitted from the computer to the print device, the same control may be performed for a copy printing. For example, the print device 200 (FIG. 1) of the first illustrative embodiment may a malfunction machine including a scanner function (image reading section). The print data acquisition unit 110 reads the document using the image reading section to acquire the scanning data for every page generated when a user inputs an instruction to perform copy printing. The print data acquisition unit 110 may execute the conversion process for the scanning data corresponding to the plural pages acquired to generate (acquire) the print data including plural page data.

(5) The function of the device control section 100 according to the first illustrative embodiment or the function of the printer driver 500 according to the second illustrative embodiment may be performed by a separate computer (e.g., a cloud server) different from the print device or the computer operated by the user. For example, the print job transmitted from the computers 300 and 400 in the first illustrative embodiment may be transmitted to the separate computer. The generation of the print data or the print control including the control of the waiting period T(k) (e.g., control of the timing of transmitting the page data to the print data 200) may be performed by the separate computer.

(6) Although the print device 200 receives the waiting period release instruction or the print cancel instruction in the first illustrative embodiment, the computer 300 may receive those instructions as well as the print device 200, or only the computer 300 may receive those instructions. Also, although the computer 600 (printer driver 500) receives the waiting period release instruction or the print cancel instruction in the second illustrative embodiment, the printers 700 and 800 may receive those instructions as well as the computer 600, or only the print devices 700 and 800 may receive those instructions. That is, the control device (the print device 200 in the first illustrative embodiment and the computer 600 in the second illustrative embodiment) which is a main subject of the print control of the confirmation mode may not include the release reception unit or the print cancel reception unit, and the printing can be canceled in accordance with the instruction from the user while at least print execution section (the print execution section 240 in the first illustrative embodiment, and the print devices 700 and 800 in the second illustrative embodiment) is executing the printing.

(7) The number of waiting pages WN to which the waiting period T(k) is set and the number of stop pages SN to which the main scanning stop period ST(k) is set may be set in accordance with the total value of the print pages. For example, in the first illustrative embodiment, the number of pages corresponding to a predetermined proportion of the total value of the print page based on one print job may be set as the number of waiting pages WN. For example, the delay period setting unit 140 determines the initial value T0 by the designation of the user, and determines the number of waiting pages WN in accordance with the total value of the print pages. In this instance, the increment ΔT is set to be shorter as the total value of the print pages is larger, as can be appreciated from the above-described equation ΔT=T0/WN. In this way, since the number of waiting pages WN or the length of the waiting period T(k) is adjusted according to the total value (the number of prints), for example, it is possible to suppress the print time from being excessively extended, thereby improving the convenience of the printing, even though the number of prints is small.

(8) In the first illustrative embodiment, if there is no designation of the user, the delay period setting unit 140 sets the waiting period T(k) using the transmission path information (the number of hops HN). However, other information may be used to set the waiting period T(k). The printing device 200 may store in the non-volatile storage device 230 the information (value) relating to a physical distance between the computer which is the transmission source of the print job and the print device 200, for example, information specifying physical positional relationship between the computers 300 and 400 and the print device 200, more specifically, information specifying a floor or room in which the computers 300 and 400 and the print device 200 are installed. It is preferable that the delay period setting unit 140 sets the longer waiting period as the physical distance between the computer which is the transmission source of the print job and the print device 200 is longer.

(9) In the above illustrative embodiments, a part of the configuration achieved by hardware may be substituted by software. On the contrary, a part of the configuration achieved by software may be substituted by hardware.

While the present invention has been shown and described with reference to certain illustrative embodiments thereof, it will be understood by those skilled in the art that various changes in form and details may be made therein without departing from the spirit and scope of the invention as defined by the appended claims.

What is claimed is:

1. A control device for controlling a print execution section, the control device comprising:
   a processor; and
   memory which stores a computer program that, when executed by the processor, causes the processor to perform:
      acquiring print data including first page data, second page data to be processed subsequent to the first page data, and third page data to be processed subsequent to the second page data;
      executing a print control using the print data to control the print execution section to execute printing of a plurality of pages;
      cancelling the printing in response to a user instruction while the printing is performed;
      executing a period control of controlling a first period and a second period, the first period being from a start of printing using the first page data to a start of printing using the second page data and being extended by a first predetermined delay period, the second period being from the start of printing using the second page data to a start of printing using the third page data, and the first period being longer than the second period;
      receiving, during a period from a completion of printing using the first page data to the start of printing using the second page data, a release instruction from a user to cancel the period control;
      when the release instruction is received before the first period elapses, starting printing using the second page data before the first period elapses;
      when the release instruction is not received before the first period elapses, starting printing after the first period elapses;
      controlling to display, during the period from the completion of printing using the first page data to the start of printing using the second page data, a first screen indicating that a cancel instruction to cancel printing can be received;
      when the cancel instruction is received before the first period elapses, cancelling the print control; and
      when the cancel instruction is not received before the first period elapses, starting printing using the second page data and controlling to switch a display screen from the first screen to a second screen indicating that printing is being performed.

2. The control device according to claim 1, wherein the computer program, when executed by the processor, causes the processor to perform controlling the period from the start of printing using the first page data to the start of printing using the second page data to become the first period by delaying, by the first predetermined delay period, a timing of supplying the second page data, which has been generated, to the print execution section after the first page data is supplied to the print execution section.

3. The control device according to claim 1,
wherein the print data further includes a fourth page data to be processed subsequent to the third page data,
wherein the computer program, when executed by the processor, causes the processor to perform:
   controlling the second period by using a predetermined second delay period which is shorter than the first predetermined delay period,
   controlling a third period, the third period being from the start of printing using the third page data to a start of printing using the fourth page data, and
wherein the second period is longer than the third period.

4. The control device according to claim 1,
wherein the computer program, when executed by the processor, causes the processor to perform causing a difference between a length of the first period and a length of the second period longer as the first predetermined delay period for determining the first period is longer.

5. The control device according to claim 1,
wherein the computer program, when executed by the processor, causes the processor, when performing printing using a last page data to be processed lastly in the print data, not to execute the period control using the first predetermined delay period.

6. The control device according to claim 1,
wherein the computer program, when executed by the processor, causes the processor to perform setting the first predetermined delay period in accordance with a user instruction.

7. The control device according to claim 1,
wherein the control device is provided in a print device which includes the print execution section and is connectable to a computer via a network, and
wherein the computer program, when executed by the processor, causes the processor to perform:
executing the print control using the print data transmitted to the print device from the computer; and
setting the first predetermined delay period using information on a distance between the computer and the printing device.

8. A non-transitory computer-readable medium storing a computer program for controlling a print execution section, the computer program, when executed by a computer, causing the computer to perform:
acquiring print data including first page data, second page data to be processed subsequent to the first page data, and third page data to be processed subsequent to the second page data;
executing a print control using the print data to control the print execution section to execute printing of a plurality of pages;
cancelling the printing in response to a user instruction while the printing is performed; and
executing a period control of controlling a first period and a second period, the first period being from a start of printing using the first page data to a start of printing using the second page data and being extended by a first predetermined delay period, and the second period being from the start of printing using the second page data to a start of printing using the third page data, and the first period being longer than the second period;
receiving, during a period from a completion of printing using the first page data to the start of printing using the second page data, a release instruction from a user to cancel the period control;
when the release instruction is received before the first period elapses, starting printing using the second page data before the first period elapses;
when the release instruction is not received before the first period elapses, starting printing after the first period elapses;
controlling to display, during the period from the completion of printing using the first page data to the start of printing using the second page data, a first screen indicating that a cancel instruction to cancel printing can be received;
when the cancel instruction is received before the first period elapses, cancelling the print control; and
when the cancel instruction is not received before the first period elapses, starting printing using the second page data and controlling to switch a display screen from the first screen to a second screen indicating that printing is being performed.

9. The control device according to claim 1,
wherein the computer program, when executed by the processor, causes the processor to perform executing the period control such that the print execution section starts printing using the second page data when a delay period based on the first predetermined delay period elapses after printing using the first page data is completed.

10. The control device according to claim 1,
wherein the computer program, when executed by the processor, causes the processor to perform executing the period control such that the print execution section starts printing using the second page data when a first delay period based on the first predetermined delay period elapses after printing using the first page data is completed, and the print execution section starts printing using the third page data when a second delay period which is shorter than the first delay period elapses after printing using the second page data is completed, whereby the first period becomes longer than the second period.

11. The control device according to claim 1,
wherein the print execution section is configured to execute printing while performing reciprocating operations of a print head in a main scanning direction, and
wherein the computer program, when executed by the processor, causes the processor to perform executing the period control such that the print execution section performs a second reciprocating operation when a delay period based on the first predetermined delay period after a first reciprocating operation is completed.

12. The control device according to claim 1,
wherein the print execution section is configured to execute printing while performing reciprocating operations of a print head in a main scanning direction, and
wherein the computer program, when executed by the processor, causes the processor to perform executing the period control such that the print execution section performs reciprocating operations with a first delay period between each reciprocating operation when printing using the first page data, and the print execution section performs reciprocating operations with a second delay period which is shorter than the first delay period between each reciprocating operations when printing using the second page data, whereby the first period becomes longer than the second period.

13. The control device according to claim 1,
wherein the computer program, when executed by the processor, causes the processor to perform:
selecting a print mode in accordance with a user instruction; and
executing the period control using the first predetermined delay period if a first print mode is selected, and not executing the period control using the first predetermined delay period if a second print mode is selected.

14. The control device according to claim 1,
wherein the first screen includes a first button to receive the cancel instruction.

15. The control device according to claim 1,
wherein the first screen includes a second button to receive the release instruction.

16. The non-transitory computer-readable medium storing a computer program according to claim 8,
wherein the computer program, when executed by the computer, causes the computer to perform:
receiving, during a period from a completion of printing using the first page data to the start of printing using the second page data, a release instruction from a user to cancel the period control;
when the release instruction is received before the first period elapses, starting printing using the second page data before the first period elapsed; and
when the release instruction is not received before the first period elapses, printing after the first period elapses.

17. A control device for controlling a print execution section, the control device comprising:

a processor; and
memory which stores a computer program that, when executed by the processor, causes the processor to perform:
  acquiring print data including first page data, second page data to be processed subsequent to the first page data, and third page data to be processed subsequent to the second page data;
  executing a print control using the print data to control the print execution section to execute printing of a plurality of pages;
  cancelling the printing in response to a user instruction while the printing is performed;
  executing a period control of controlling a first period and a second period, the first period being from a start of printing using the first page data to a start of printing using the second page data and being extended by a first predetermined delay period, the second period being from the start of printing using the second page data to a start of printing using the third page data, and the first period being longer than the second period;
  controlling to display, during a period from a completion of printing using the first page data to the start of printing using the second page data, a first screen including a button to receive a release instruction to cancel the period control;
  when the release instruction is received before the first period elapses, starting printing using the second page data before the first period elapses; and
  when the release instruction is not received before the first period elapses, switching a display screen from the first screen to a second screen indicating that the printing is being performed and starting printing using the second page data after the first period elapses.

* * * * *